Aug. 14, 1962  D. F. DALY  3,049,371
SPRING HELD AND BIASED LATCH
Filed Aug. 25, 1959
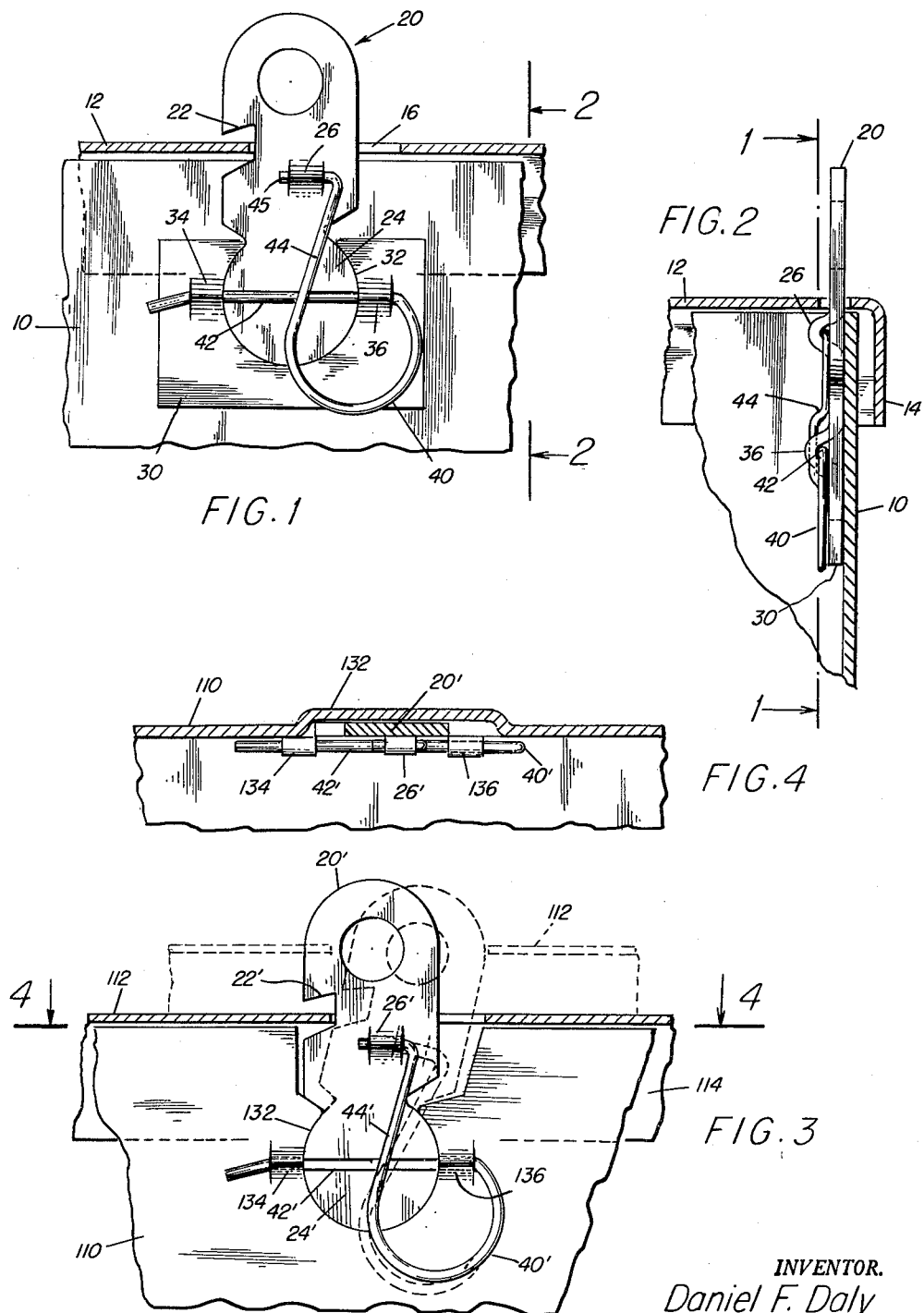
INVENTOR.
Daniel F. Daly
BY his attorneys
Howson and Howson United States Patent Office 3,049,371
Patented Aug. 14, 1962

3,049,371
SPRING HELD AND BIASED LATCH
Daniel F. Daly, Hartford, Conn., assignor to The Arrow-Hart & Hegeman Electric Company, Hartford, Conn., a corporation of Connecticut
Filed Aug. 25, 1959, Ser. No. 835,912
5 Claims. (Cl. 292—128)

This invention relates to a novel form and arrangement of a latch and its biasing spring for latching covers on boxes, particularly boxes adapted for use as housings for switches and other electric apparatus.

It is an object of the invention to provide a novel combination of latch and dual-functioning biasing and securing spring which will require a minimum number of parts when associated with a box and its cover for electric switches and other apparatus.

Another object of the invention is to provide a novel form of latch and biasing spring having the aforementioned characteristics which may be used in connection with conventional box and cover structures without the need to vary the structure of the box.

Another object is to adapt the invention to a box and cover in which the only parts, in addition to the box and cover, that are required for securing and biasing the latch are the latch itself and its spring.

Other objects and advantages of the invention will appear as the invention is described in connection with the accompanying drawing.

In the drawing:

FIG. 1 is a fragmentary elevation view, partly in section, along line 1—1 of FIG. 2 of a latch and box embodying the invention.

FIG. 2 is a fragmentary vertical section view with a section along line 2—2 of FIG. 1.

FIG. 3 is a view similar to FIG. 1 of a latch and box embodying another form of the invention.

FIG. 4 is a fragmentary horizontal sectional view taken along line 4—4 of FIG. 3.

Referring to the drawing, a conventional switch box having a flat side wall 10 and a cover 12, with flange 14 fitting over the edge of the side walls of the box, may be hinged to the box in usual fashion.

In the cover adjacent the box wall, a narrow rectilinear slot 16 is formed to receive a latch 20 stamped from sheet metal in the form illustrated in FIGURE 1. The latch is formed wtih a nose 22, conventionally adapted to overlie the cover at one end of the slot when in latching position. The latch is normally biased into latching position by a spring as hereinafter described.

To pivotally support the latch, its inner end is formed as a circular bearing portion 24 to fit in a circular recess 32 in a bearing plate 30 stamped from sheet metal and secured flat against the inner surface of the box side wall 10 in any suitable conventional fashion such as by welding, riveting or by screws. The thickness of the bearing plate is preferably about the same as that of the latch.

In order to hold the bearing portion 24 of the latch in the bearing recess 32 of the bearing plate and simultaneously to provide a bias urging the latch toward latching position, a unique form and arrangement of spring is provided. This spring has a loop portion 40 from which extends a straight anchoring-and-securing end portion 42 which extends diametrically across the surface of the bearing portion of the latch. To hold this anchoring-and-securing end in position, semi-cylindrical or arcuate tunnel-like loops 34 and 36 are lanced out of bearing plate 30 in aligned diametrically opposite positions on opposite sides of the bearing recess 32 to receive the anchoring-and-securing end 42 of the spring. The loops 34 and 36 are of size to receive and fit the end of the spring which when passed through them will lie on the surface of the bearing portion 24 of the latch and hold it in assembled position against the box wall and within the bearing recess 32. The spring 42 may be secured in place by bending its extremity, such bend and the looped portion 40 of the spring in cooperation with the lanced-out loops 34 and 36 holding the spring from any material lateral movement.

The spring performs the additional function of biasing the latch by having the extremity 45 of its opposite or biasing end 44 hooked into a tunnel-like loop 26 (similar to loops 34 and 36) lanced out of the midportion of the latch. The bias of the spring serves to hold the hooked extremity 45 of the biasing portion in the loop 26 and at the same time to bias the latch toward the latching position as shown in FIGURE 1.

The form of the invention just described is adapted to use with conventional boxes without any change in the box structure by simply attaching permanently the bearing plate 30 to the box wall 10 in position for the latch to extend through the cover slot 16 when the cover closes.

It is possible, however, for the invention to be incorporated in a box with one less part than in FIGURES 1 and 2 as will be understood from consideration of FIGURES 3 and 4.

In this second form of the invention, the bearing plate may be omitted and the side wall 110 of the box may be formed to provide a bearing for the circular or pivot end 24' of the latch 20'. The latch and spring may be as in the form of FIGURES 1 and 2, the reference numerals in FIGURES 3 and 4 being the same with a prime added to identify similar parts.

In FIGURES 3 and 4, the bearing for the latch is provided by pressing out of the plane of the side wall of the box a circular recess 132 of size and shape to receive and fit the bearing portion 24' of the latch. The top edge of the side wall above the pressed-out bearing recess may be punched out to provide room for the pivoting of the mid-portion of the latch; or, alternatively, that portion of the side wall of the box may be pressed out to provide an extrusion large enough to permit pivoting of the latch. If the wall is cut out above the bearing recess, it will be covered by the flange 114 of the cover when the box is closed so that no unwanted openings will remain through which the equipment in the box could be tampered with.

In FIGURES 3 and 4, the anchoring-and-securing end 42 of the spring is maintained in place across the latch bearing 24' as before by being inserted through lanced-out loops 134 and 136; but in this instance, these loops are lanced out of the side walls of the box on opposite sides of the bearing recess 132 in diametrically opposite aligned positions.

From the foregoing, it will be clear that the form of invention illustrated in FIGURES 1 and 2 can be applied to conventional electric switch boxes and the like having usual slots for reception of a latch. This may be done merely by securing the bearing plate to the inside wall of the box in the manner described without the need of any additional parts or for any alteration of the flat side wall of the box.

Alternatively, the invention may be applied as in FIGURES 3 and 4 to a box and cover by forming the side wall of the box in the manner described which will avoid the need for the bearing plate and, thus, require one less part than in FIGURES 1 and 2.

Other modifications within the scope of the invention will occur to those skilled in the art. Therefore, the invention is not limited to the particular forms illustrated and described.

What is claimed is:

1. In combination with a box wall, a one-piece latch member of stamped sheet material having a latching portion and a flat circular pivot portion, means forming a circular bearing recess on said wall in which said pivot portion is pivotally engaged for movement parallel to said wall, and a spring having a biasing portion engaging and biasing said latch member and having an anchoring portion fixedly positioned to lie across the flat circular portion of said latch member and secure it pivotally and permanently in its mounting.

2. In combination with a box wall, a one-piece latch member of stamped sheet material having a flat latching portion and a flat circular pivot portion, means forming a circular bearing recess on said wall in which said flat circular pivot portion is pivotally engaged for movement parallel to said wall, portions on said means adjacent said recess being lanced out, and a spring engaging and biasing said latch member and having a portion fixedly positioned to lie across said flat circular pivot portion and passing through said lanced-out portions and lying across said flat circular picot portion and permanently securing said latch member pivotally in its mounting.

3. In a combination with a box wall, a flat latch member of stamped sheet material having a flat latching portion and a flat circular pivot portion, means in connection with the box wall providing a circular bearing recess in which said flat circular pivot portion fits pivotally for movement parallel to said wall, loop portions adjacent said recess and separate from said latch member, and a spring engaged with said latch member and biasing it, said spring having an anchor portion insertable through said loop portions and in said inserted position lying diametrically across said flat pivot portion and securing it against removal from said recess.

4. In combination with a box wall, a latch member of stamped sheet material having a latch portion and having a flat partially circular pivot portion lying against said wall, a plate secured to said wall having a bearing recess therein into which said pivot portion fits pivotally, a biasing spring engaging said latch member and attached to said plate on both sides of said pivot portion and overlying said latch member, said spring in said overlying position permanently securing said latch in said recess against said wall.

5. In combination with a box wall, a latch member of stamped sheet material having a flat latch portion and a flat partially circular pivot portion, said wall having a bearing recess pressed therein against the bottom of which one face of said pivot portion lies, a biasing spring engaging said latch member and attached to said box wall lying across the opposite face of said pivot portion, said spring in said overlying position permanently securing said latch member in said recess.

References Cited in the file of this patent

UNITED STATES PATENTS

| | | |
|---|---|---|
| 604,786 | Pletcher | May 31, 1898 |
| 1,298,892 | Church | Apr. 1, 1919 |
| 1,597,728 | Sadler | Aug. 31, 1926 |
| 1,661,634 | Pekar | Mar. 6, 1928 |
| 2,300,504 | Hedges | Nov. 3, 1942 |
| 2,712,594 | Zingone | July 5, 1955 |
| 2,794,664 | Kruger | June 4, 1957 |
| 2,926,237 | Sorenson | Feb. 23, 1960 |

FOREIGN PATENTS

| | | |
|---|---|---|
| 495,430 | Great Britain | Nov. 14, 1938 |